W. A. KRESS.
AUTO DEVICE.
APPLICATION FILED FEB. 10, 1916.
1,211,597.
Patented Jan. 9, 1917.
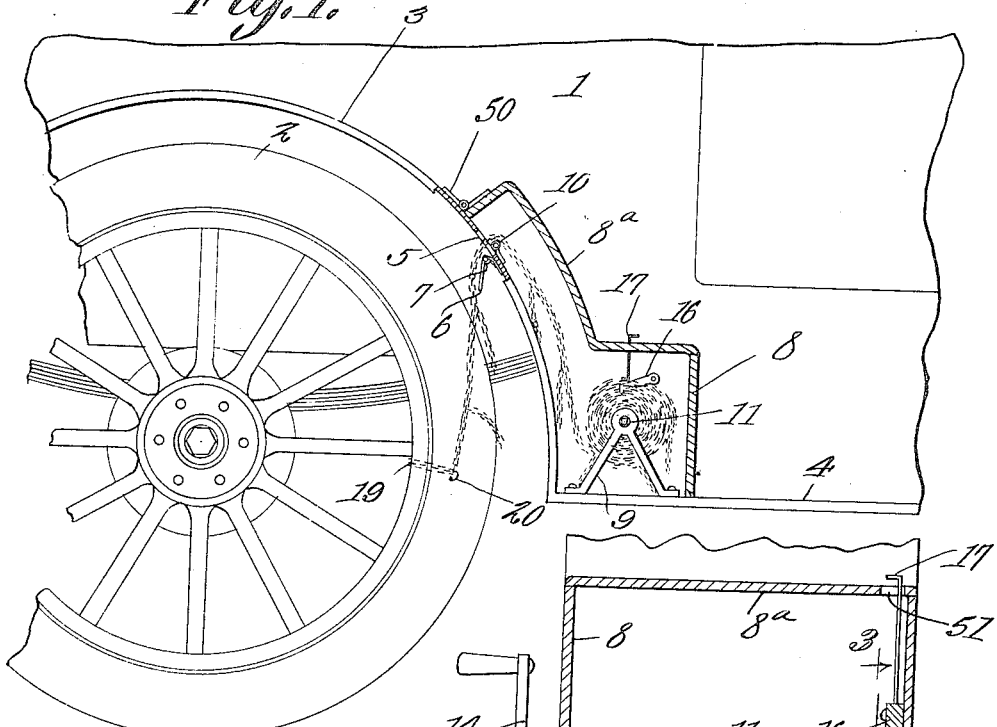
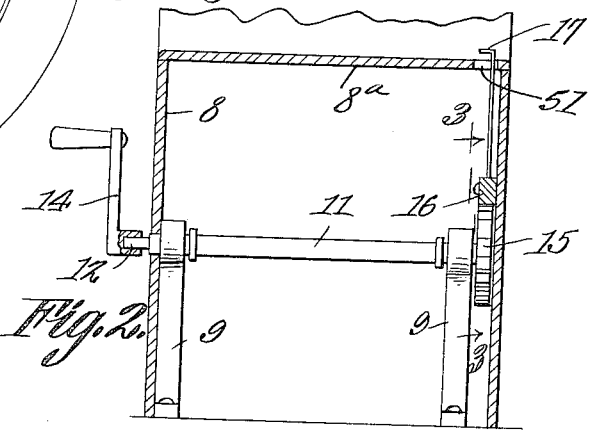
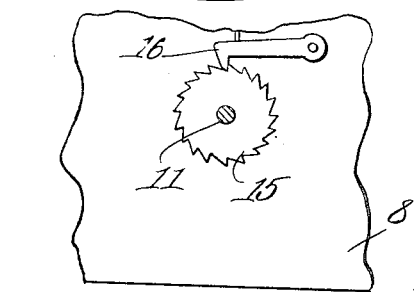
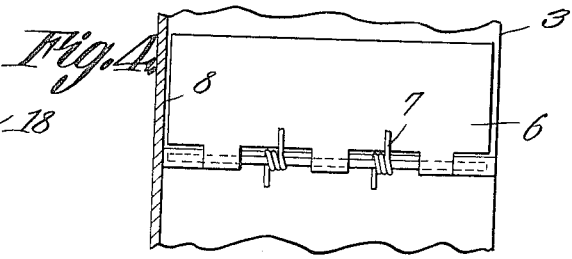
W. A. Kress
Inventor,
Witnesses
by
Attorneys.

UNITED STATES PATENT OFFICE.

WILLITTS A. KRESS, OF COFFEYVILLE, KANSAS.

AUTO DEVICE.

1,211,597.  Specification of Letters Patent.  Patented Jan. 9, 1917.

Application filed February 10, 1916. Serial No. 77,488.

*To all whom it may concern:*

Be it known that I, WILLITTS A. KRESS, a citizen of the United States, residing at Coffeyville, in the county of Montgomery and State of Kansas, have invented a new and useful Auto Device, of which the following is a specification.

The device forming the subject matter of this application is a traction element adapted to be applied to the wheel of a motor propelled vehicle, for the purpose of aiding in operating the vehicle when the same is stalled in the mud.

The invention aims to provide novel means for mounting a flexible traction element on a vehicle in such a manner that the flexible traction element may be applied to the wheel of a vehicle readily and, with equal facility be detached from the wheel of the vehicle and be reeled up on the vehicle, when occasion for the use of the traction element has passed.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawing:—Figure 1 shows in side elevation, a vehicle whereunto the device forming the subject matter of this application has been applied, parts appearing in section; Fig. 2 is a cross section through the casing wherein the flexible traction element is contained when not in use; Fig. 3 is a section taken on the line 3—3 of Fig. 2; Fig. 4 is a detailed view illustrating the movable door which controls the opening through which the flexible traction element passes; Fig. 5 is a fragmental perspective showing a portion of the flexible traction element and the means whereby the same is assembled with the wheel of a vehicle.

In the drawings there is shown a portion of the body of an automobile, the same being denoted by the reference character 1. One of the ground wheels is shown at 2 and the mud guard appears at 3.

The numeral 4 designates the running board.

In the guard 3 there is formed an opening 5 controlled by a downwardly and outwardly moving hinged door 6 normally held in a closed position by a spring 7. Journaled on the mud guard 3 adjacent the opening 5 is a roller 10.

Assembled with the running board 4 and the mud guard 3 is a casing 8 having a lid 8ª which is hingedly mounted as shown at 50.

Fixed to and upstanding from the running board 4 and located within the casing 8 are standards 9 on which is journaled for rotation a shaft 11 the end 12 of which protrudes through the casing and is adapted to receive a removable crank 14. Attached to the other end of the shaft 11 is a ratchet wheel 15 adapted to coact with a pawl 16 pivoted on the casing 8 and adapted to be operated by a controlling member 17 passing through an opening 51 in the lid 8ª of the casing 8. Wound about the shaft 11 and preferably secured at one end thereto is a flexible traction element of any desired sort, the same in the present instance being delineated in the form of a chain 18.

In practical operation, the pawl 16 is raised by the controlling member 17, permitting the flexible traction element 18 to be reeled off the shaft 11, one end of the flexible traction element being passed across the roller 10 and out of the opening 5 in the mud guard 3. By means of a connection 19, ordinarily in the form of a short length of chain having hooks 20 at its ends, the end of the traction element 18 is secured to the ground wheel 2. If, now, the ground wheel is rotated the flexible traction element may be wound around the periphery of the wheel, the traction element ordinarily being of considerably greater length than the circumference of the wheel. When the wheel 2 is supplemented by the flexible traction element 18, sufficient hold on the ground will be afforded, so that the vehicle will be moved out of a mud hole or out of any other position in which it may happen to be stalled. After the vehicle is out of the mud hole, the vehicle is backed, the wheel 2 passing to one side of the mud hole, this operation serving to free the flexible traction element 18 from the periphery of the wheel. The crank 14 may be applied to the shaft 11, thereby to rotate the shaft and to reel the flexible traction element on the shaft. After the flexible traction element has been reeled onto the shaft 11, the pawl may be let down, thereby to prevent an accidental unreeling of the flexible traction element.

It is not necessary that the inner end of the flexible traction element 18 be secured to the shaft 11. If desired, the flexible traction element may be of a sufficient length to extend approximately once around the ground wheel 2 and after the flexible traction wheel has been assembled with the ground wheel in the manner hereinbefore described, the ends of the flexible element may be connected to hold the same on the ground wheel, whereupon the ground wheel may be rotated indefinitely and to the desired extent, until the vehicle is clear of the position in which it has been stalled.

It is not obligatory that the casing 8 and the shaft 11 be placed as shown on the guard 3 and the running board 4, the parts in question being capable of location in a different place from that shown without jeopardizing the utility of the invention.

Having thus described the invention, what is claimed is:—

In a vehicle, a running board; a mud guard having an opening; a casing located in the angle defined by the running board and the mud guard; a vertically movable lid for the casing and having an aperture; standards carried by the running board and located within the casing; a shaft journaled in the standards and projecting at one end through the casing; winding means detachably assembled with the projecting end of the shaft; a ratchet wheel secured to the shaft; a pawl pivoted to the casing and coacting with the ratchet wheel; a pawl controlling member assembled with the pawl and projecting through the aperture in the lid; and a flexible traction member provided at one end with wheel engaging means, the traction member being extended through the opening in the mud guard and being connected with the shaft.

In testimony that I claim the foregoing as my own, I have hereto affixed my signature in the presence of two witnesses.

WILLITTS A. KRESS.

Witnesses:
FRANK S. JOHNSON,
JIM L. SWISHER.